(12) United States Patent
Ferrara et al.

(10) Patent No.: US 10,161,775 B2
(45) Date of Patent: Dec. 25, 2018

(54) METHOD FOR DETERMINING FUEL CONSUMPTION OF AN INTERNAL COMBUSTION ENGINE

(71) Applicant: GM GLOBAL TECHNOLOGY OPERATIONS LLC, Detroit, MI (US)

(72) Inventors: Umberto Ferrara, Turin (IT); Serena Tordin, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 166 days.

(21) Appl. No.: 15/380,305

(22) Filed: Dec. 15, 2016

(65) Prior Publication Data

US 2018/0170288 A1 Jun. 21, 2018

(51) Int. Cl.
*G01F 1/69* (2006.01)
*G01C 22/02* (2006.01)
(Continued)

(52) U.S. Cl.
CPC ............ *G01F 1/69* (2013.01); *B60R 16/0236* (2013.01); *F02M 35/10386* (2013.01);
(Continued)

(58) Field of Classification Search
CPC ............... F01N 2240/25; F01N 3/2073; F01N 2570/14; F01N 2610/00; F01N 3/208; F02D 2200/0406; F02D 2200/0402; F02D 41/0007; F02D 41/1454; F02D 41/0072; F02D 41/18; F02D 2041/001; F02D 2200/0411; F02D 35/023; F02D 41/0002; F02D 41/0082; F02D 41/144; F02D 41/182; F02D 41/22; F02D 41/20; F02D 41/3035; F02D 13/0261; F02D 35/02; F02D 41/008; F02D 41/0087; F02D 41/0235; F02D 41/1441; F02D 41/1456; F02D 41/187; F02D 41/2467; F02D 41/2474;
(Continued)

(56) References Cited

U.S. PATENT DOCUMENTS 6,308,671 B1 * 10/2001 Reed ..................... F01L 1/34
123/399
6,370,935 B1 * 4/2002 He ..................... F02D 41/0055
702/100

(Continued)

*Primary Examiner* — Anne M Antonucci
*Assistant Examiner* — Sanjeev Malhotra
(74) *Attorney, Agent, or Firm* — Quinn IP Law

(57) ABSTRACT

A method can be used for determining fuel consumption of an internal combustion engine of a vehicle, in real time. The method includes determining a fuel injection quantity of the internal combustion engine based on an oxygen concentration signal from an oxygen sensor and a MAF signal from a mass airflow (MAF) sensor. The MAF sensor is coupled to the intake line and is configured to measure and monitor the mass flow rate of intake air flowing through the intake line. The method further includes determining, via an engine control module (ECM), an instantaneous fuel flow of the internal combustion engine based on the fuel injection quantity. The method further includes communicating, via the ECM, the instantaneous fuel flow to a body control module (BCM) and determining, via the BCM, an average fuel economy of the internal combustion engine based on the fuel flow.

20 Claims, 3 Drawing Sheets

(51) Int. Cl.
  *F02M 65/00* (2006.01)
  *F02M 57/00* (2006.01)
  *F02M 35/16* (2006.01)
  *F02M 35/10* (2006.01)
  *G01M 15/10* (2006.01)
  *B60R 16/023* (2006.01)
(52) U.S. Cl.
  CPC ........... *F02M 35/16* (2013.01); *F02M 57/005* (2013.01); *F02M 65/001* (2013.01); *G01C 22/02* (2013.01); *G01M 15/104* (2013.01)
(58) Field of Classification Search
  CPC ....... Y02T 10/47; Y02T 10/144; Y02T 10/18; Y02T 10/44; F02B 17/005
  USPC ....... 701/22, 31.4, 33.4, 103, 104, 108, 109; 123/3, 305, 399, 458, 703; 60/274, 285, 60/295
  See application file for complete search history.

(56) References Cited

U.S. PATENT DOCUMENTS

| | | | |
|---|---|---|---|
| 2006/0241849 A1* | 10/2006 | Gangopadhyay ... | F02D 41/1454 701/108 |
| 2007/0124055 A1* | 5/2007 | Kang ................. | F02D 35/02 701/108 |
| 2009/0099724 A1* | 4/2009 | Kranz ................. | G01F 1/115 701/33.4 |
| 2009/0187301 A1* | 7/2009 | Wang ................. | F02D 41/18 701/31.4 |
| 2009/0216425 A1* | 8/2009 | Hay ................... | F02D 41/065 701/103 |
| 2010/0180838 A1* | 7/2010 | Lewis, III ............ | C01B 3/32 123/3 |
| 2010/0186390 A1* | 7/2010 | Perry ................. | F01N 3/2073 60/295 |
| 2010/0186391 A1* | 7/2010 | Najt ................... | B01D 53/8696 60/295 |
| 2010/0212295 A1* | 8/2010 | Narayanaswamy ......... | F02D 41/0082 60/285 |
| 2010/0224169 A1* | 9/2010 | Cinpinski ............ | F02D 41/2438 123/458 |
| 2010/0318279 A1* | 12/2010 | Meyer ................. | F02D 35/021 701/103 |
| 2011/0184632 A1* | 7/2011 | Kang ................. | F02D 41/0007 701/109 |
| 2011/0202256 A1* | 8/2011 | Sauve ................ | F02D 41/0025 701/104 |
| 2012/0042850 A1* | 2/2012 | Haskara ............. | F02D 41/0072 123/305 |
| 2012/0116626 A1* | 5/2012 | Perkins .............. | B60W 10/06 701/22 |
| 2013/0269317 A1* | 10/2013 | Narayanaswamy ...... | F01N 3/20 60/274 |
| 2013/0332050 A1* | 12/2013 | Song ................. | F02D 41/144 701/104 |
| 2014/0130785 A1* | 5/2014 | Levijoki ............. | F02D 41/1441 123/703 |
| 2015/0032359 A1* | 1/2015 | Tordin ............... | F02D 41/1456 701/104 |
| 2015/0345417 A1* | 12/2015 | Zhu .................. | F02D 41/18 73/114.32 |
| 2016/0047328 A1* | 2/2016 | Buslepp ............. | F02D 41/26 701/104 |
| 2017/0107920 A1* | 4/2017 | Roth ................. | F02D 35/02 |
| 2017/0114748 A1* | 4/2017 | Roth ................. | F02B 1/14 |
| 2017/0191429 A1* | 7/2017 | Tylutki .............. | F02B 37/12 |

* cited by examiner

METHOD FOR DETERMINING FUEL CONSUMPTION OF AN INTERNAL COMBUSTION ENGINE

INTRODUCTION

The present disclosure relates to a system and method for determining fuel consumption of an internal combustion engine based on inputs from an oxygen sensor and a mass air flow (MAF) sensor.

Most vehicles, such as cars, include an internal combustion engine for propulsion. Internal combustion engines combust an air/fuel mixture to move a reciprocating piston. The reciprocating motion of the vehicle is then converted into rotational movement to propel the vehicle.

SUMMARY

Because internal combustion engines use fuel, it is desirable to determine (e.g., estimate) the fuel consumption of vehicle in real time. To do so, the presently disclosed method and system employ inputs from one or more oxygen sensors and MAF sensors to estimate the fuel consumption in real time and communicate the determined fuel consumption to the vehicle operator in real time via, for example, an instrument panel display.

According to an aspect of the present disclosure, a method can be used for determining fuel consumption of an internal combustion engine of a vehicle, in real time. By implementing the presently disclosed method, an engine control module and a body control module act in concert and use input signals from an oxygen sensor coupled to an exhaust line and a mass airflow (MAF) sensor coupled to an intake line to maximize the accuracy of the average fuel economy displayed on an instrument panel of the vehicle, thereby improving the functioning of the instrument panel and the vehicle. The method includes determining a fuel injection quantity of the internal combustion engine based on an oxygen concentration signal from an oxygen sensor and a MAF signal from a MAF sensor. The internal combustion engine is part of an engine assembly. The engine assembly includes an exhaust line in fluid communication with the internal combustion engine. The oxygen sensor is coupled to the exhaust line and is configured to measure and monitor the oxygen concentration of exhaust gases flowing through the exhaust line. The engine assembly includes an intake line in fluid communication with the internal combustion engine. The MAF sensor is coupled to the intake line and is configured to measure and monitor the mass flow rate of intake air flowing through the intake line. The method further includes determining, via an engine control module (ECM) of the engine assembly, an instantaneous fuel flow of the internal combustion engine based on the fuel injection quantity. The method further includes communicating, via the ECM, the instantaneous fuel flow to a body control module (BCM) of the vehicle. The method further includes determining, via the BCM, an average fuel economy of the internal combustion engine based on the fuel flow. The average fuel economy is a fuel efficiency described in terms of a relationship between the distance traveled by the vehicle and the amount of fuel consumed by the vehicle. The method further includes displaying the average fuel economy on a display of an instrument panel of the vehicle. In the present disclosure, the term "average fuel economy" means the average fuel economy is a fuel efficiency of the vehicle described in terms of a relationship between the distance traveled by the vehicle and the amount of fuel consumed by the vehicle. For example, the average fuel economy may be a ratio of a distance traveled by the vehicle divided by the fuel consumed (in volume) by the internal combustion engine during the traveled distance. The method may further include determining, by the ECM, an accumulated fuel consumption based on the oxygen concentration signal from the oxygen sensor, the MAF signal from the MAF sensor, and a position signal from a actuator position sensor of the vehicle. The method may further include determining, by the ECM, an accumulate fuel consumption per engine cycle based on the oxygen concentration signal from the oxygen sensor, the MAF signal from the MAF sensor, and the position signal from the actuator position sensor. The method may further include determining, by the ECM, an instantaneous fuel flow based on the fuel injection quantity. The instantaneous fuel flow may be a ratio of a fuel volume consumed by the vehicle divided by time. The method may further include communicating the accumulated fuel consumption to the BCM. The method may further include communicating the instantaneous fuel flow to the BCM. The method may further include receiving, by the BCM, an odometer signal from the odometer of the vehicle. The method may further include determining, by the ECM, an accumulated fuel consumption based on the oxygen concentration signal from the oxygen sensor, the MAF signal from the MAF sensor, and a position signal from a actuator position sensor of the vehicle. The method may further comprising determining, by the ECM, an accumulate fuel consumption per engine cycle based on the oxygen concentration signal from the oxygen sensor, the MAF signal from the MAF sensor, and the position signal from the actuator position sensor. The method may further include determining, by the ECM, an instantaneous fuel flow based on the fuel injection quantity. The instantaneous fuel flow may be a ratio of a fuel volume consumed by the vehicle divided by time. The method may further include communicating the accumulated fuel consumption to the BCM. The method may further include communicating the instantaneous fuel flow to the BCM. The method may further include receiving, by the BCM, an odometer signal from the odometer of the vehicle. The odometer signal is indicative of the distance traveled by the vehicle. The average fuel economy is based on the distance traveled by the vehicle and the accumulated fuel consumption. The average fuel economy is based on the distance traveled by the vehicle and the accumulated fuel consumption.

The present disclosure also describes a vehicle. According to an aspect of the present disclosure, the vehicle includes an engine assembly, and ECM, and a BCM. The ECM and BCM act in concert and use input signals from an oxygen sensor coupled to an exhaust line and a mass airflow (MAF) sensor coupled to an intake line to maximize the accuracy of the average fuel economy displayed on an instrument panel of the vehicle, thereby improving the functioning of the instrument panel and the vehicle. The engine assembly includes an internal combustion engine. The engine assembly further includes an intake line in fluid communication with the internal combustion engine. The intake line is configured to transport intake air into the internal combustion engine. The engine assembly further includes an exhaust line in fluid communication with the internal combustion engine. The exhaust line is configured to transport exhaust gases out of the internal combustion engine. The engine assembly further includes an oxygen sensor coupled to the exhaust line and configured to measure an oxygen concentration of exhaust gases flowing through the exhaust line. The oxygen sensor is configured to generate an oxygen concentration signal indicative of the oxygen concentration of the exhaust gases. The engine assembly further includes a mass airflow (MAF) sensor coupled to the intake line and configured to measure a mass airflow of the intake air flowing through the intake line. The MAF sensor is configured to generate a MAF signal indicative of the mass airflow of the intake air flowing through the intake line. The engine assembly further includes an engine control module (ECM) including an engine processor and an engine memory in communication with the engine processor. The ECM is in communication with the oxygen sensor. As such, the ECM is configured to receive the oxygen concentration signal. The ECM is in communication with the MAF sensor. As such, the ECM is configured to receive the MAF signal. The vehicle further includes a vehicle body assembly. The vehicle body assembly includes a body control module (BCM) in communication with the ECM. The vehicle body assembly further includes an instrument panel in communication with the BCM. The instrument panel includes a display. The ECM is specifically programmed to: (a) determine a fuel injection quantity of the internal combustion engine based on an oxygen concentration signal from an oxygen sensor and a MAF signal from a mass airflow (MAF) sensor; (b) an instantaneous fuel flow of the internal combustion engine based on the fuel injection quantity; and (c) communicate the instantaneous fuel flow to the BCM. The BCM is specially programmed to: (a) determine an average fuel economy of the vehicle based on the instantaneous fuel flow, wherein the average fuel economy is a fuel efficiency of the vehicle described in terms of a relationship between the distance traveled by the vehicle and the amount of fuel consumed by the vehicle; and (b) command the display on the instrument panel to display the average fuel economy. The average fuel economy may be a ratio of a distance traveled by the vehicle divided by the fuel consumed (in volume) by the internal combustion engine during the distance traveled by the vehicle. The vehicle further includes a torque request actuator and a actuator position sensor coupled to the torque request actuator. The actuator position sensor is configured to generate a position signal indicate of a position of the torque request actuator. The ECM is specifically programmed to determine an accumulated fuel consumption based on the oxygen concentration signal from the oxygen sensor, the MAF signal from the MAF sensor, and the position signal from the actuator position sensor. The vehicle ECM is specifically programmed to determine an accumulate fuel consumption per engine cycle based on the oxygen concentration signal from the oxygen sensor, the MAF signal from the MAF sensor, and the position signal from the actuator position sensor. The ECM may be specifically programmed to determine an instantaneous fuel flow based on the fuel injection quantity, and the instantaneous fuel flow is a ratio of a fuel volume consumed by the vehicle divided by time. The ECM may be specifically programmed to communicate the accumulated fuel consumption to the BCM. The ECM may be specifically programmed to communicate the instantaneous fuel flow to the BCM. The vehicle further includes an odometer. The BCM may be specifically programmed to receive an odometer signal from the odometer of the vehicle. The odometer signal is indicative of the distance traveled by the vehicle. The average fuel economy is based on the distance traveled by the vehicle and the accumulated fuel consumption.

According to an aspect of the present disclosure, the ECM includes an engine processor, an engine memory in communication with the engine processor, and a clock in communication with the engine processor and the engine memory. The BCM includes a body processor and a body memory in communication with the body processor. The oxygen sensor is directly coupled to the exhaust line. The MAF sensor is directly coupled to the intake line. The ECM is specifically programmed to determine the fuel injection quantity of the internal combustion engine based on the oxygen concentration signal from the oxygen sensor and the MAF signal from the mass airflow (MAF) sensor only when none of a plurality of predetermined conditions exists, wherein the plurality of predetermined condition includes: (a) the oxygen sensor is not active, (b) the oxygen sensor is faulty, and (c) the oxygen sensor temperature is less than a predetermined temperature threshold. The ECM is specifically programmed to determine the fuel injection quantity solely based on a feed forward correction map and the position of the torque request actuator only when any of the previously mentioned predetermined conditions exist.

The present disclosure also describes a system. According to an aspect of the present disclosure, the system includes a ECM and a BCM. The ECM and BCM act in concert and use input signals from an oxygen sensor coupled to an exhaust line and a mass airflow (MAF) sensor coupled to an intake line to maximize the accuracy of the average fuel economy displayed on an instrument panel of the vehicle, thereby improving the functioning of the instrument panel and the vehicle. The engine assembly includes an internal combustion engine. The engine assembly further includes an intake line in fluid communication with the internal combustion engine. The intake line is configured to transport intake air into the internal combustion engine. The engine assembly further includes an exhaust line in fluid communication with the internal combustion engine. The exhaust line is configured to transport exhaust gases out of the internal combustion engine. The system further includes an oxygen sensor coupled to the exhaust line and configured to measure an oxygen concentration of exhaust gases flowing through the exhaust line. The oxygen sensor is configured to generate an oxygen concentration signal indicative of the oxygen concentration of the exhaust gases. The system further includes a mass airflow (MAF) sensor coupled to the intake line and configured to measure a mass airflow of the intake air flowing through the intake line. The MAF sensor is configured to generate a MAF signal indicative of the mass airflow of the intake air flowing through the intake line. The engine assembly further includes an engine control module (ECM) including an engine processor and an engine memory in communication with the engine processor. The ECM is in communication with the oxygen sensor. As such, the ECM is configured to receive the oxygen concentration signal. The ECM is in communication with the MAF sensor. As such, the ECM is configured to receive the MAF signal. The vehicle further includes a vehicle body assembly. The vehicle body assembly includes a body control module (BCM) in communication with the ECM. The vehicle body assembly further includes an instrument panel in communication with the BCM. The instrument panel includes a display. The ECM is specifically programmed to: (a) determine a fuel injection quantity of the internal combustion engine based on an oxygen concentration signal from an oxygen sensor and a MAF signal from a mass airflow (MAF) sensor; (b) an instantaneous fuel flow of the internal combustion engine based on the fuel injection quantity; and (c) communicate the instantaneous fuel flow to the BCM. The BCM is specially programmed to: (a) determine an average fuel economy of the vehicle based on the instantaneous fuel flow, wherein the average fuel economy is a fuel efficiency of the vehicle described in terms of a relationship between the distance traveled by the vehicle and the amount of fuel consumed by the vehicle; and (b) command the display on the instrument panel to display the average fuel economy. The average fuel economy may be a ratio of a distance traveled by the vehicle divided by the fuel consumed (in volume) by the internal combustion engine during the distance traveled by the vehicle.

The above features and advantages and other features and advantages of the present teachings are readily apparent from the following detailed description of the best modes for carrying out the teachings when taken in connection with the accompanying drawings.

DETAILED DESCRIPTION

Figure 1:
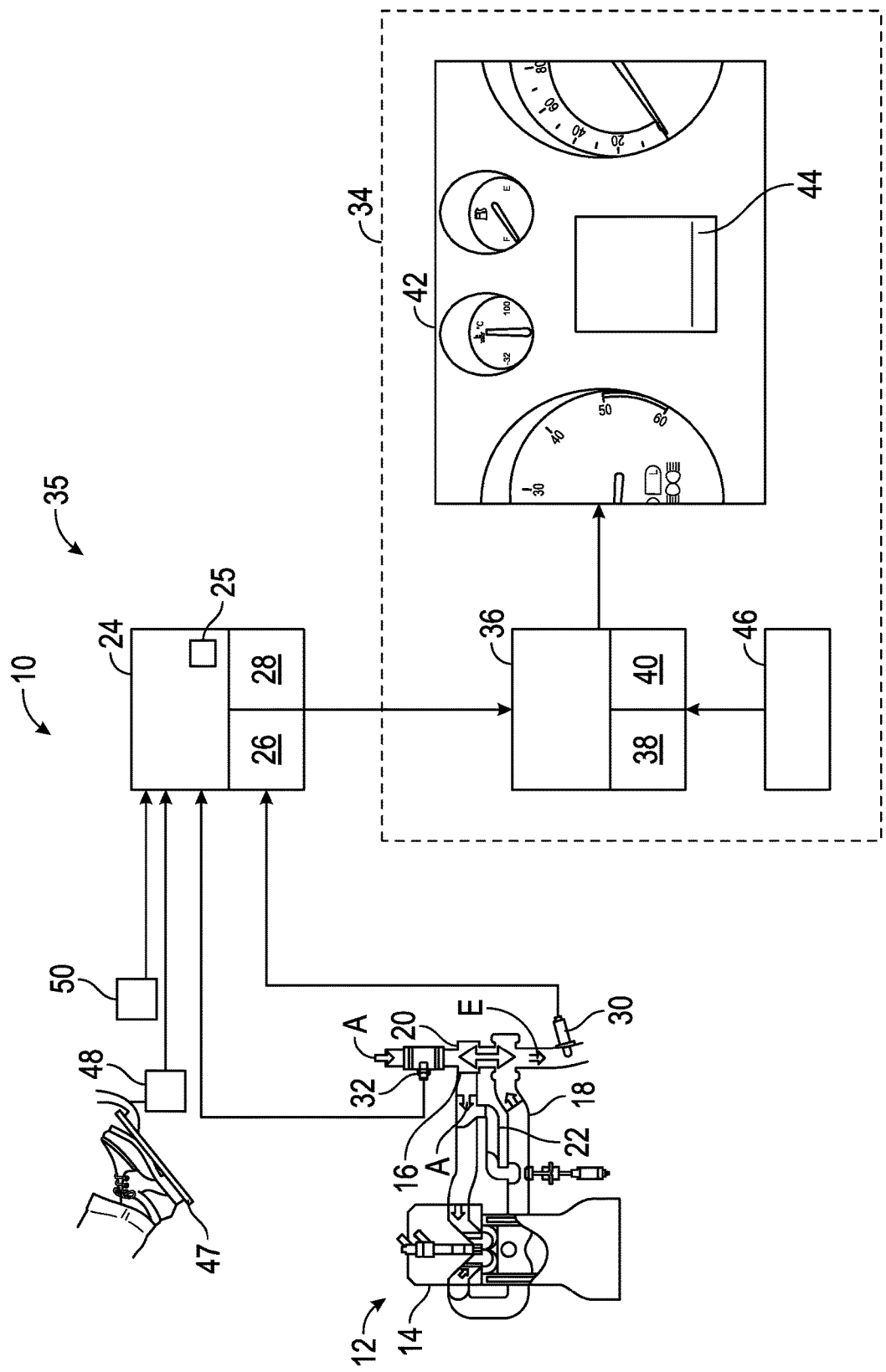
FIG. 1 is a schematic illustration of a vehicle including an internal combustion engine.

Referring to the drawings, wherein like reference numbers correspond to like or similar components throughout the several figures, and beginning with FIG. 1 schematically illustrates a vehicle 10 including an engine assembly 12 for propulsion. The engine assembly 12 includes an internal combustion engine 14, an intake line 16 in fluid communication with the internal combustion engine 14, and an exhaust line 18 in fluid communication with the internal combustion engine 14. The intake line 16 is a fluid conduit capable of transporting intake air A into the internal combustion engine 14. During operation, the internal combustion engine 14 can combust an air/fuel mixture in order to propel the vehicle 10. After combustion, exhaust gases E exit the internal combustion engine 14 through the exhaust line 18. Therefore, the exhaust line 18 is a fluid conduit capable of transporting exhaust gases E exiting from the internal combustion engine 14. The engine assembly 12 may include a turbocharger 20 between the intake line 16 and the exhaust line 18 to enhance the propulsion of the vehicle 10. In addition to the turbocharger 20, the engine assembly 12 may include an exhaust gas recirculation line (EGR) line 22 fluidly interconnecting the intake line 16 and the exhaust line 18. The EGR line 22 is a fluid conduit for directing at least some of the exhaust gases E from the exhaust line 18 into the intake line 16 in order to minimize fuel consumption.

An engine control module (ECM) 24 regulates the amount of exhaust gases E allow to be introduced into the intake line 16. In addition, the ECM 24 is configured (i.e., constructed and programmed) to regulate other components of the engine assembly 12, such as the internal combustion engine 14. The terms "control module," "control," "controller," "control unit," "processor" and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), sequential logic circuit(s), input/output circuit(s) and devices, appropriate signal conditioning and buffer circuitry, and other components to provide the described functionality. "Software," "firmware," "programs," "instructions," "routines," "code," "algorithms" and similar terms mean any controller executable instruction sets including calibrations and look-up tables. The ECM 24 may alternative be referred to as the engine controller and may be configured as a central processing unit (CPU). In order to appropriately control operation of the engine assembly 12, the ECM 24 includes a processor (i.e., the engine processor 26) and at least one engine memory (i.e., the engine memory 28), at least some of which is tangible and non-transitory. The engine memory 28 can store controller executable instruction sets, and the engine processor 26 can execute the controller executable instruction sets stored in the engine memory 28. The engine memory 28 may be any recordable medium that participates in providing computer-readable data or process instructions. Such a medium may take many forms, including but not limited to non-volatile media and volatile media. Non-volatile media for the ECM 24 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to the engine processor 26. The engine memory 28 of the ECM 24 may also include a floppy disk, a flexible disk, hard disk, magnetic tape, any other magnetic medium, a CD-ROM, DVD, any other optical medium, etc. The ECM 24 can be configured or equipped with other required computer hardware, such as a high-speed clock 25, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the ECM 24 or accessible thereby may be stored in the engine memory 28 and automatically executed to provide the required functionality for the engine assembly 12. The clock 25 is in communication with the engine memory 28 and the engine processor 26. The clock 25 may be part of the engine processor 26.

The engine assembly 12 further includes a plurality of sensors in communication (e.g., electronic communication) with the ECM 24. In the depicted embodiment, the engine assembly 12 includes an oxygen sensor 30 coupled to the exhaust line 18 and is configured (i.e., designed and constructed) to measure the oxygen concentration of exhaust gases E flowing through the exhaust line 18. The oxygen sensor 30 may be directly coupled to the exhaust line 18 to maximize the accuracy of its measurement. The oxygen sensor 30 may be zirconium dioxide, or zirconia, lambda sensor and is operatively coupled to the exhaust line 18 and can therefore measure and monitor the percentage of oxygen in the gases inside the exhaust line 18 (i.e., the oxygen percentage $O_2$). For example, the oxygen sensor 30 can measure and monitor the oxygen mass percentage of the exhaust gases E inside the exhaust line 18. The ECM 24 can receive an input signal from the oxygen sensor 30 and then determine the oxygen percentage $O_2$ based on that input signal. In the present disclosure, the input signal generated by the oxygen sensor 30 is referred to as the oxygen concentration signal. The ECM 24 therefore receives the input signal from the oxygen sensor 30 and can determine the fuel-to-air ratio based on this input signal. The fuel-to-air ratio is a value with units of mass of fuel divided by mass of air.

The engine assembly 12 additionally includes a mass airflow (MAF) sensor 32 in communication (e.g., electronic communication) with the ECM 24. The MAF sensor 32 is operatively coupled to the intake line 16 and can therefore measure and monitor the mass airflow (MAF) of fresh air A flowing through the intake line 16 (i.e., the mass airflow MAF). The MAF sensor 32 may be directly coupled to the intake line 16 to maximize the accuracy of its measurement. As non-limiting examples, the MAF sensor 32 may be vane meter sensor or a hot wire sensor. The MAF sensor 32 can generate an input signal indicative of the mass airflow of the intake air flowing through the intake line 16. The ECM 24 can receive the input signal from the MAF sensor 32 and determine the mass airflow of the intake air A flowing through the intake line 16 based on the input signal received from the MAF sensor 32. In the present disclosure, the input signal generated by the MAF sensor 32 is referred to as the MAF signal. In the depicted embodiment, the MAF sensor 32 is coupled to the intake line 16 at a location upstream of the interface between the intake line 16 and the EGR line 22. As a consequence, in this embodiment, the MAF sensor 32 is configured (i.e., designed, located, and constructed) to measure the mass airflow of the intake air A flowing through the intake line 16 before the intake air A is mixed with the exhaust gases E entering the intake line 16 through the EGR line 22.

The engine assembly 12 further includes a torque request actuator 47, such as an accelerator pedal, for requesting additional torque from the internal combusting engine 14. The torque request actuator 47 is therefore is communication with the ECM 24. The ECM 24 can the request a specific amount of torque based on the torque requested by the vehicle operator through the torque request actuator 47. The engine assembly 12 also includes a actuator position sensor 48 configured to measure and monitor the position of the torque request actuator 23. The actuator position sensor 48 may be integrated into the torque request actuator 47. Regardless, the actuator position sensor 48 is coupled to the torque request actuator 47. As such, the actuator position sensor 48 can monitor and determine the position of the torque request actuator 47.

The engine assembly 12 further includes a temperature sensor 50 in communication (e.g., electronic communication) with the ECM 24. As a non-limiting example, the temperature sensor 50 may be a thermistor or a thermocouple. The temperature sensor 50 is configured (i.e., designed and constructed) to monitor and measure temperature. For example, the temperature sensor 50 may be configured to monitor and measure the atmospheric temperature and/or the temperature of the oxygen sensor 30. The temperature sensor 50 may be directly coupled to the oxygen sensor 30 to measure the temperature of the oxygen sensor 30. Alternatively, the temperature sensor 50 may be integrated with the oxygen sensor 30. The temperature sensor 50 is configured to generate an input signal (i.e., the temperature signal) that is indicative of the atmospheric temperature and/or the temperature of the oxygen sensor 30. Since the ECM 24 is in communication with the temperature sensor 50, the ECM 24 can receive the temperature signal and determine the atmospheric temperature and/or the temperature of the oxygen sensor 30 based on the temperature signal.

Aside from the engine assembly 12, the vehicle 10 includes a vehicle body assembly 34 including a body control module (BCM) 36 and an instrument panel 42 in communication (e.g., electronic communication) with the BCM 36. The BCM 36 is in communication (e.g., electronic communication) with the ECM 24 and is configured (i.e., constructed and programmed) to monitor and control various electronic accessories of the vehicle body assembly 34. As non-limiting examples, the BCM 36 is configured to monitor and control the instrument panel 42, power windows, power mirrors, among others. The BCM 36 may alternative be referred to as the body controller and may be configured as a central processing unit (CPU). In order to appropriately control operation of the vehicle body assembly 34, the BCM 36 includes a processor (i.e., the body processor 38) and at least one memory (i.e., the body memory 40), at least some of which is tangible and non-transitory. The body memory 40 can store controller executable instruction sets, and the body processor 38 can execute the controller executable instruction sets stored in the body memory 40. The body memory 40 may be any recordable medium that participates in providing computer-readable data or process instructions. Such a medium may take many forms, including but not limited to non-volatile media and volatile media. Non-volatile media for the BCM 36 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to the body processor 38. The body memory 40 of the BCM 36 may also include a floppy disk, a flexible disk, hard disk, magnetic tape, any other magnetic medium, a CD-ROM, DVD, any other optical medium, etc. The BCM 36 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the BCM 36 or accessible thereby may be stored in the body memory 40 and automatically executed to provide the required functionality for the vehicle body assembly 34.

The vehicle body assembly 34 further includes an instrument panel 42 in communication with the BCM 36. The instrument panel 42 includes one or more displays and/or gauges for providing information to the vehicle operator. In one or more embodiments, the instrument panel 42 has at least one display 44 configured to display fuel economy information to the vehicle operator as discussed below. As a non-limiting example, the display 44 may be a digital monitor capable visually showing (on the visible spectrum) the average fuel economy of the vehicle 10, in real time.

In addition to the display 44, the instrument panel 42 includes an odometer 46 capable of determining and displaying (digitally or analogically) the distance traveled by the vehicle 10. The odometer 46 may be part of the instrument panel 42 and may determine the distance traveled by the vehicle based on input signals from a speed sensor coupled to a vehicle tire. To determine the distance traveled by the vehicle 10, the odometer 46, for example, multiplies the revolutions per minutes (as determined by the speed sensor coupled to the wheel) by the diameter of the wheel. The odometer 46 is capable of generating and outputting an odometer signal, which is indicative of the distance traveled by the vehicle 10. The BCM 36 is in communication with the odometer 46 and can therefore receive the odometer signal from the odometer 46. The BCM 36 can then determine the distance traveled by the vehicle 10 based on the odometer signal received from the odometer 46.

The ECM 24 and the BCM 36 collectively form a system 35 for determining the average fuel economy of the vehicle 10. To do so, the ECM 24 and the BCM 36 are specially programmed to execute the steps of the method 100 for determining (e.g., estimating) fuel economy of the vehicle 10 as described below. By implementing the method 100, the ECM 24 and the BCM 36 act in concert to maximize the accuracy of the average fuel economy displayed on the instrument panel 42, thereby improving the functioning of the instrument panel 42 and the vehicle 10. Furthermore, the ECM 24, BCM 36, the actuator position sensor 48, the instrument panel 42, the display 44, the MAF sensor 32, and the oxygen sensor 30 act in concert to maximize the accuracy of the average fuel economy information provided to the vehicle operator, thereby improving the functioning of the instrument panel 42 and the vehicle 10. In addition to the BCM 36 and the ECM 24, the actuator position sensor 48, the instrument panel 42, the display 44, the MAF sensor 32, and the oxygen sensor 30 may be part of the system 35 and work together to improve the functioning of the instrument panel 42. The term "average fuel economy" means the fuel efficiency described in terms of the relationship between the distance traveled by the vehicle 10 and the amount of fuel consumed by the vehicle 10. As non-limiting examples, the average fuel economy may be expressed in terms of distance traveled by the vehicle 10 divided by the amount of fuel consumed by the vehicle 10 (in terms of volume). For example, the average fuel economy may be displayed on the instrument panel 42 in miles per gallon (i.e., miles/gallons). In other words, the average fuel economy may be a ratio of a distance traveled by the vehicle divided by the fuel consumed in volume by the vehicle during the traveled distance. Alternatively or additionally, the average fuel economy may be expressed in the amount of fuel consumed by the vehicle 10 and/or the internal combustion engine 14 divided by the distance traveled by the vehicle 10. For instance, the average fuel economy may be displayed on the instrument panel 42 in liters of fuel divided by one hundred kilometers (i.e., liters/100 kilometers).

Figure 2:
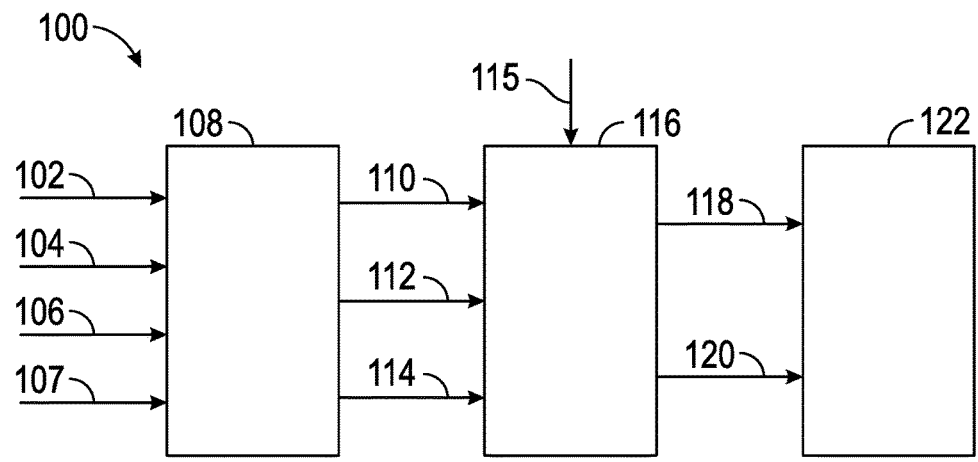
FIG. 2 is a schematic flowchart illustrating a method for estimating fuel consumption of the vehicle illustrated in FIG. 1.

With reference to FIGS. 1 and 2, one or more embodiments, the method 100 for determining fuel economy of the vehicle 10 can be stored as computer-readable instructed in the ECM 24 and/or BCM 36. In the method 100, the ECM 24 receives a plurality of input signals. In particular, at step 102, the ECM 24 receives an input signal from the oxygen sensor 30 (i.e., the oxygen concentration signal). As discussed above, the oxygen concentration signal is indicative of the oxygen concentration of exhaust gases E flowing through the exhaust line 18. At step 104, the ECM 24 receives an input signal from the MAF sensor 32 (i.e., the MAF signal). As discussed above, the MAF signal is indicative of the mass airflow of the intake air A flowing through the intake line 16. At step 106, the ECM 24 receives an input signal from the actuator position sensor 48 (i.e., the position signal). As discussed above, the position signal is indicative of the position of the torque request actuator 23. At step 107, the ECM 24 receives an input signal from the temperature sensor 50 (i.e., the temperature signal).

With continuing reference to FIGS. 1 and 2, after executing steps 102, 104, and 106, the ECM 24 executes step 108. At step 108, the ECM 24 determines the accumulated fuel consumption, the instantaneous fuel flow, the accumulate fuel consumption per engine cycle based on the oxygen concentration signal from the oxygen sensor, the MAF signal from the MAF sensor 32, and the position signal from the actuator position sensor 48. As discussed above with respect to FIG. 3, the oxygen concentration signal from the oxygen sensor, the MAF signal from the MAF sensor 32, and the position signal from the actuator position sensor 48 are used to determine (e.g., estimate) the fuel injection quantity of the internal combustion engine 14. The term "fuel injection quantity of the internal combustion engine" means an amount (in terms of mass) of the fuel injected into the internal combustion engine. The determined fuel injection quantity is then used to determine the accumulated fuel consumption, the instantaneous fuel flow, the accumulate fuel consumption per engine cycle. The accumulated fuel flow is the fuel consumed by the internal combustion engine 14 in terms of volume from a specific moment in time to the present. This specific moment in time may be when the internal combustion engine starts running (even during idling). As discussed below, the ECM 24 may calculate the accumulated fuel flow in terms of volume using the density of the fuel consumed by the internal combustion engine 14. The ECM 24 may include a specific rollover (e.g., 2 liters) in determining the accumulated fuel consumption. The term "instantaneous fuel flow" means the fuel consumed by the internal combustion engine 14 (in terms of volume) per unit of time. Therefore, the instantaneous fuel flow is a value with units of volume divided by units of time. The accumulate fuel consumption per engine cycle is the fuel consumed by the internal combustion engine 14 (in terms of volume) per each engine cycle.

After executing step 108, at step 110, the ECM 24 communicates the accumulated fuel consumption. At step 112, the ECM 24 communicates the instantaneous fuel flow to the BCM 36. At step 114, the ECM 24 communicates the accumulate fuel consumption per engine cycle to the BCM 36. In other words, at steps 110, 112, and 114, the BCM 36 receives input signals from the ECM 24 that are indicative of the accumulated fuel consumption, the instantaneous fuel flow, and the accumulate fuel consumption per engine cycle, respectively. In addition, at step 115, the BCM 36 receives the odometer signal from the odometer 46. Then, the BCM 36 determines the distance traveled by the vehicle 10 (i.e., the accumulated distance) based on the odometer signal received from the odometer 46. The method 100 then continues to step 116.

At step 116, the BCM 36 determines the average fuel economy and the instantaneous fuel economy based on the distance traveled by the vehicle 10 (i.e., the accumulated distance) and the accumulated fuel consumption. The average fuel economy may be the fuel consumed by the vehicle 10 per a specified amount of traveled distance (in kilometers or miles). For instance, the average fuel economy may be expressed in terms of fuel volume per a specific amount of distance traveled by the vehicle 10 (e.g., liters of fuel consumed by the vehicle for each one hundred kilometers). Alternatively or additionally, the average fuel economy may be expressed in distance traveled by the vehicle per volume of fuel consumed (e.g., miles per gallon). At step 116, the BCM 36 also determines the instantaneous fuel economy based on the instantaneous fuel flow. The instantaneous fuel flow may be equal to the instantaneous fuel economy and may be expressed in terms of volume per unit of time (e.g., liters per hour).

After executing step 116, the BCM 36 communicates the average fuel economy to the instrument panel 42 at step 118. At step 120, the BCM 36 communicates the instantaneous fuel flow to the instrument panel 42. Then, at step 122, the average fuel economy and/or instantaneous fuel flow is displayed on the display 44. Specifically, the BCM 36 can command the display 44 to display the average fuel economy and/or instantaneous fuel flow. The display 44 may show average fuel economy and/or instantaneous fuel flow in a textual and/or graphic form.

Figure 3:
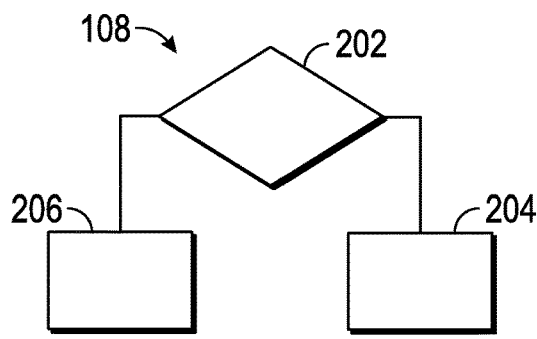
FIG. 3 is a schematic flowchart illustrating sub-steps of the method schematically shown in FIG. 1.

With reference to FIG. 3, the step 108 of the method 100 may include sub-steps 202, 204, and 206. In sub-step 202, the ECM 24 determines whether any of the following predetermined conditions exists: (a) the oxygen sensor is not active; (b) a fault occurs on the oxygen sensor (i.e., the oxygen sensor is faulty); and (c) the oxygen sensor temperature is less than a predetermined temperature threshold determined through calibration. The listed predetermined conditions are mere examples. More or fewer conditions may be considered by the ECM 24. If none of the predetermined conditions exists, then the ECM 24 executes step 204. As a non-limiting example, the ECM executes step 204 only when any of the following predetermined conditions exists: (a) the oxygen sensor is not active; (b) a fault occurs on the oxygen sensor (i.e., the oxygen sensor is faulty); and (c) the oxygen sensor temperature is less than a predetermined temperature threshold determined through calibration.

At sub-step 204, the ECM 24 determines the fuel injection quantity into the internal combustion engine 14 based on the inputs from the sensors (e.g., the oxygen sensors 30, the MAF sensor 32, and/or the actuator position sensor 48). At step 204, the ECM 24 may update a feed forward correction map using the sensors and a fuel request set point as discussed below. The feed forward correction map may be a calibrated, adaptive map obtained by testing the vehicle 10 and may be stored in the engine memory 28 of the ECM 24. The feed forward correction map is adapted using the sensors as discussed above. As non-limiting example, at step 204, the ECM 24 updates a feed forward correction map using the sensors and a fuel request set point as discussed below only when none of the following predetermined conditions exists: (a) the oxygen sensor is not active; (b) a fault occurs on the oxygen sensor (i.e., the oxygen sensor is faulty); and (c) the oxygen sensor temperature is less than a predetermined temperature threshold determined through calibration. If any of the predetermined conditions exists, then the ECM 24 executes sub-step 206. As non-limiting example, if (a) the oxygen sensor is not active; (b) the oxygen sensor is faulty; and (c) the oxygen sensor temperature is less than a predetermined temperature threshold determined through calibration, then the ECM 24 executes sub-step 206. At sub-step 206, the ECM 24 determines (e.g., estimates) the fuel injection quantity into the internal combustion engine 14 solely using the feed forward correction map and the position of the torque request actuator 47 as discussed below. As a non-limiting example, at sub-step 206, the ECM 24 determines (e.g., estimates) the fuel injection quantity into the internal combustion engine 14 solely using the feed forward correction map only when any of the following predetermined conditions exist: (a) if the oxygen sensor is not active; (b) the oxygen sensor is faulty; and (c) the oxygen sensor temperature is less than a predetermined temperature threshold determined through calibration.

Figure 4:
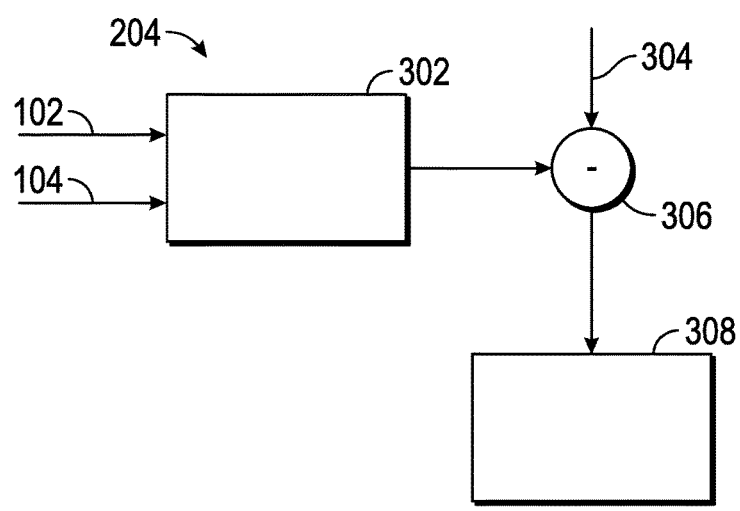
FIG. 4 is a schematic flowchart illustrating sub-steps of the method schematically shown in FIG. 1.
Figure 5:
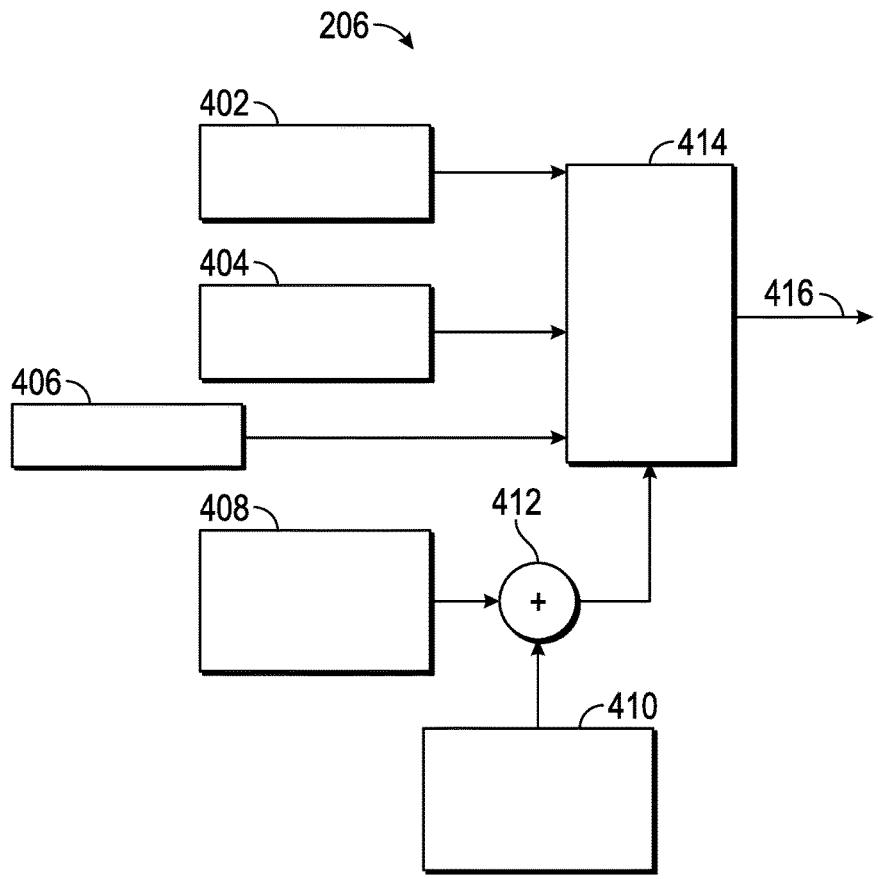
FIG. 5 is a schematic flowchart illustrating sub-steps of the method schematically shown in FIG. 1.

With reference to FIG. 4, in order to execute step 206, the ECM 24 executes multiple sub-steps 302, 304, and 306. At step 302, the ECM 24 determines (e.g., calculates) the fuel injection quantity based on the input signal from the oxygen sensor 30 (i.e., step 102) and the input signal from the MAF sensor 32 (i.e., step 104). In other words, the ECM 24 determines (e.g., calculates) the fuel injection quantity as a function of the oxygen concentration of the exhaust gases E flowing through the exhaust line 18 and the mass airflow of the intake air A flowing through the intake line 16. As discussed above, the ECM 24 can determine the fuel-to-air ratio based on the input signal from the MAF sensor 32. To calculate the fuel injection quantity flow (in units of mass of fuel divided by time), the ECM 24 can, for example, multiply the mass air flow of the intake air A flowing through the intake line 16, as determined based on the input signal from the MAF sensor 32, times the fuel-to-air ratio of the internal combustion engine 14, as determined based in the input signal from the oxygen sensor 30. The ECM 24 can then measure time (from a specific moment in time, such as when the internal combustion engine 14 starts running) using its internal clock 25 and multiple this measured time times the fuel injection quantity flow in order to determine the fuel injection quantity (in term of mass).

At sub-step 304, the ECM 24 determines a fuel request set-point based on the input signal from the actuator position sensor 48. As used herein, the term "fuel request set-point" means the amount of fuel expected to be injected into the internal combustion engine (in terms of mass) based on the position of the torque request actuator 47. As a non-limiting example, the ECM 24 may include a calibration table that correlates the position of the torque request actuator 47 with the fuel request set-point. This calibration table may be obtained by testing the vehicle 10 and may be stored in the engine memory 28 of the ECM 24. After the ECM 24 determines the fuel request set-point at step 304, the ECM 24 executes step 306. At step 306, the ECM 24 determines a fuel correction value based on the fuel injection quantity (as determined in step 302) and the fuel request set-point (as determined in step 304). For instance, the ECM 24 can subtract the fuel injection quantity from the fuel request set-point to determine the fuel correction value. In other words, in one or more embodiments, the fuel correction value is equal to the fuel request set-point minus the fuel injection quantity. Then, at step 308 the ECM 24 stores the updated fuel correction value in the engine memory 28 in order to update the feed forward fuel correction map.

As discussed above, instead of executing sub-step 204, the ECM 24 may execute step 206 when, for example, (a) the oxygen sensor 30 is not active; (b) the oxygen sensor 30 is faulty; and (c) the oxygen sensor temperature is less than a predetermined temperature threshold. At certain temperatures, the measurement from the oxygen sensor 30 may not be reliable. As a non-limiting example, the ECM 24 executes sub-step 206 only when any of the following predetermined conditions exist: (a) the oxygen sensor 30 is not active; (b) the oxygen sensor 30 is faulty; and (c) the oxygen sensor temperature is less than a predetermined temperature threshold. Sub-step 206 includes multiple sub-steps 402, 404, 406, 408, and 410. At sub-steps 402, 404, and 406, the ECM 24 determines whether any of the predetermined conditions exist. For example, at sub-step 402, the ECM 24 determines if the oxygen sensor 30 is not active. The ECM 24 can determine that the oxygen sensor 30 is not active if, for example, the ECM 24 does not receive an input signal from the oxygen sensor 30. At sub-step 404, the ECM 24 determines that the oxygen sensor 30 is faulty and, therefore, the input signal from the oxygen sensor 30 is unreliable. The ECM 24 can determine that the oxygen sensor 30 is faulty if the input signal received by the ECM 24 from the oxygen sensor 30 is corrupted and cannot be read. At sub-step 406, the ECM 24 determines that the temperature of the oxygen sensor 30 is less than a predetermined temperature threshold and, therefore, the measurement taken by the oxygen sensor 30 is not reliable. If any of the predetermined conditions determined in sub-steps 402, 404, and 406 exist, then the ECM 24 determines the fuel injection quantity based on the fuel request set-point and the feed forward fuel correction map. To do so, at step 408, the ECM 24 determines the fuel request set-point as discussed above with respect to sub-step 304. As described above, the fuel request set-point can be determined based on the position of the torque request actuator 47, and the ECM 24 can determine the position of the torque request actuator 47 based on the input signal from the actuator position sensor 48. Although sub-steps 304 and 408 are described as different steps, these steps may actually be the same step executed by the ECM 24. After determining the fuel request set-point at sub-step 408, the ECM 24 executes step 410. At step 410, the ECM 24 retrieves a fuel correction value from the feed forward fuel correction map. The feed forward fuel correction map correlates the fuel request set-points with specific fuel correction values. Thus, at sub-step 410, the ECM 24 retrieves the fuel correction value that corresponds with the specific fuel set-point. Then, the ECM 24 proceeds to sub-step 412. At sub-step 412, the ECM 24 determines (e.g., calculates) the fuel injection quantity based on the fuel correction value and the fuel request set-point. As a non-limiting example, the ECM 24 may subtract the fuel correction value from the fuel request set-point to determine the fuel injection quantity. In other words, the fuel injection quantity is equal to the fuel request set-point minus the fuel correction value. Then, the ECM 24 executes sub-step 414. At sub-step 414, the ECM 24 determines that the fuel injection quantity is equal to the fuel request set-point minus the fuel correction value if certain predetermined conditions exist. As a non-limiting example, the ECM 24 determines that the fuel injection quantity is equal to the fuel request set-point minus the fuel correction value only when all of the following predetermined conditions exist: (a) the oxygen sensor 30 is not active; (b) the oxygen sensor 30 is faulty; and (c) the temperature of the oxygen sensor 30 is less than a predetermined temperature threshold. Next, the ECM 24 proceeds to sub-step 416. At sub-step 416, the ECM 24 communicates the fuel injection quantity determined in sub-step 414 to the BCM 36.

Figure 6:
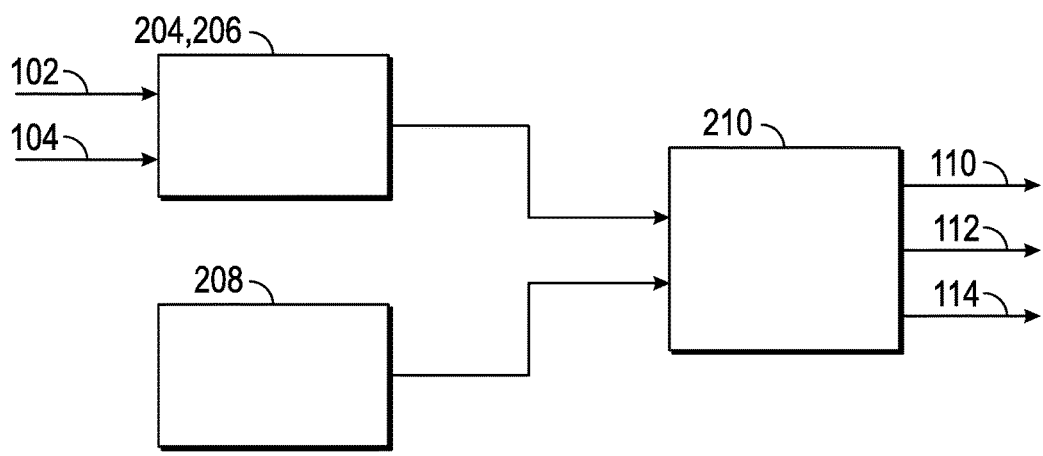
FIG. 6 is a schematic flowchart illustrating sub-steps of the method schematically shown in FIG. 1.

With reference to FIG. 6, in addition to the subs-steps 202, 204, and 206 described above with respect to FIG. 3, the step 108 includes additional sub-steps 208 and 210. As discussed above, the ECM 24 determines the fuel injection quantity as described above with respect to sub-steps 204 or 206 based, for example, on the oxygen concentration in the exhaust gases E flowing through exhaust line 18 (as measured by the oxygen sensor 30 (see step 102) and the mass airflow of the intake air A flowing through the intake line 16. As also discussed above, the fuel injection quantity may be alternatively determined based on the position of the torque request actuator 47 and the fuel correction value. In addition to sub-steps 204 and 206, the step 108 includes step 208. At step 208, the ECM 24 determines post-injection set-points based on the exhaust gases E introduced into the intake line 16 through the EGR line 22. The term "post injection set-point" is amount of fuel injected through the EGR line 22 into the intake line 16 (in terms of mass). The ECM 24 can control the amount of exhaust gases introduced into the intake line 16 through the EGR line 22 and can therefore determine the post-injection set-point. After determining the fuel injection quantity and the post injection set-point at steps 208, the ECM 24 executes step 210. At step 210, the ECM 24 determines (e.g., calculates) the accumulated fuel consumption, the instantaneous fuel flow, and the accumulate fuel consumption per engine cycle based on the fuel injection quantity and post injection set points. In doing so, the ECM 24 first determines the actual fuel injection quantity by taking into account the post injection set-points. For example, to calculate the actual injection quantity, the ECM 24 may add the post injection set-point determined in sub-step 208 to the fuel injection quantity determined in either sub-step 204 or sub-step 206. In other words, the actual fuel injection quantity may be equal to the fuel injection quantity determined in step 204 or step 206 plus the post injection set-point determined in step 208. Then, the ECM 24 determines the accumulated fuel consumption, the instantaneous fuel flow, and the accumulate fuel consumption per engine cycle based the actual fuel injection quantity. To calculate the accumulated fuel consumed by the engine (in terms of volume), the ECM 24 multiples the actual fuel injection quantity times the fuel density. The fuel density may be stored in the engine memory 28 of the ECM 24. The accumulated fuel consumed by the internal combustion engine 14 may include a specific, predetermined rollover (e.g., 2 liters). To calculate the instantaneous fuel flow (in term of volume divided by time), the ECM 24 may, for example, divide the actual fuel injection quantity by the time (e.g., second or hours) measured by its internal clock 25. To calculate the accumulate fuel consumption per engine cycle, the ECM 24 may, for example, divide actual fuel injection quantity by the engine cycles. The ECM 24 tracks the engine cycles. Next, at step 110, the ECM 24 communicates the accumulated fuel consumption. At step 112, the ECM 24 communicates the instantaneous fuel flow to the BCM 36. At step 114, the ECM 24 communicates the accumulate fuel consumption per engine cycle to the BCM 36. As discussed above with respect to steps 116, 118, 120, and 120, the BCM 36 determines the average fuel economy and the instantaneous fuel economy based on the distance traveled by the vehicle 10 (i.e., the accumulated distance) and the accumulated fuel consumption, and the average fuel economy and/or instantaneous fuel flow is displayed on the display 44 in step 122.

While the best modes for carrying out the teachings have been described in detail, those familiar with the art to which this disclosure relates will recognize various alternative designs and embodiments for practicing the teachings within the scope of the appended claims. The vehicle 10 illustratively disclosed herein may be suitably practiced in the absence of any element which is not specifically disclosed herein. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Moreover, the steps of the method 100 may be executed in any suitable sequence and not necessarily in the chronological order described above. Further, the method 100 may include additional steps.

The invention claimed is:

1. A method for determining fuel consumption of an internal combustion engine of a vehicle, comprising:
   calculating, via an engine control module (ECM) of an engine assembly, a fuel injection quantity of the internal combustion engine based on an oxygen concentration signal from an oxygen sensor and a MAF signal from a mass airflow (MAF) sensor only when none of a plurality of predetermined conditions exists, the plurality of predetermined condition includes: (a) the oxygen sensor is not active, (b) the oxygen sensor is faulty, and (c) a temperature of the oxygen sensor is less than a predetermined temperature threshold, wherein the internal combustion engine is part of the engine assembly, the engine assembly includes an exhaust line in fluid communication with the internal combustion engine, the oxygen sensor is coupled to the exhaust line and is configured to measure and monitor an oxygen concentration of exhaust gases flowing through the exhaust line, the engine assembly includes an intake line in fluid communication with the internal combustion engine, the MAF sensor is coupled to the intake line and is configured to measure and monitor a mass flow rate of intake air flowing through the intake line, wherein calculating the fuel injection quantity includes:
  determine a fuel injection quantity flow, wherein the determining the fuel injection quantity flow includes:
    determine a fuel-to-air ratio based on the oxygen concentration signal received from the oxygen sensor;
    multiply the mass airflow of the intake air flowing through the intake line, as determined by the MAF sensor, times the fuel-to-air ratio, as determined based on the oxygen concentration signal received from the oxygen sensor, in order to determine the fuel injection quantity flow;
  measure time, using an internal clock of the ECM, from a moment when the internal combustion engine starts running; and
  multiply the measured time times the fuel injection quantity flow in order to determine the fuel injection quantity;
determining, via the ECM, an instantaneous fuel flow of the internal combustion engine based on the fuel injection quantity;
communicating, via the ECM, the instantaneous fuel flow to a body control module (BCM) of the vehicle;
determining, via the BCM, an average fuel economy of the internal combustion engine based on the instantaneous fuel flow, wherein the average fuel economy is a fuel efficiency described in terms of a relationship between a distance traveled by the vehicle and an amount of fuel consumed by the vehicle; and
displaying the average fuel economy on a display of an instrument panel of the vehicle.

2. The method of claim 1, wherein the average fuel economy is a ratio of a distance traveled by the vehicle divided by a fuel consumed in volume by the internal combustion engine during a traveled distance.

3. The method of claim 2, further comprising determining, by the ECM, an accumulated fuel consumption based on the oxygen concentration signal from the oxygen sensor, the MAF signal from the MAF sensor, and a position signal from an actuator position sensor of the vehicle.

4. The method of claim 3, further comprising determining, by the ECM, an accumulated fuel consumption per engine cycle based on the oxygen concentration signal from the oxygen sensor, the MAF signal from the MAF sensor, and the position signal from the actuator position sensor.

5. The method of claim 4, further comprising determining, by the ECM, the instantaneous fuel flow based on the fuel injection quantity, wherein the instantaneous fuel flow is a ratio of a fuel volume consumed by the vehicle divided by time.

6. The method of claim 5, further comprising communicating the accumulated fuel consumption to the BCM.

7. The method of claim 6, further comprising communicating the instantaneous fuel flow to the BCM.

8. The method of claim 7, receiving, by the BCM, an odometer signal from an odometer of the vehicle.

9. The method of claim 8, wherein the odometer signal is indicative of the distance traveled by the vehicle, and the average fuel economy is based on the distance traveled by the vehicle and the accumulated fuel consumption.

10. A vehicle, comprising:
  an engine assembly including:
    an internal combustion engine;
    an intake line in fluid communication with the internal combustion engine, wherein the intake line is configured to transport intake air into the internal combustion engine;
    an exhaust line in fluid communication with the internal combustion engine, wherein the exhaust line is configured to transport exhaust gases out of the internal combustion engine;
    an oxygen sensor coupled to the exhaust line and configured to measure an oxygen concentration of exhaust gases flowing through the exhaust line, wherein the oxygen sensor is configured to generate an oxygen concentration signal indicative of an oxygen concentration of the exhaust gases;
    a mass airflow (MAF) sensor coupled to the intake line and configured to measure a mass airflow of the intake air flowing through the intake line, wherein the MAF sensor is configured to generate a MAF signal indicative of the mass airflow of the intake air flowing through the intake line;
    an engine control module (ECM) is in communication with the oxygen sensor such that the ECM is configured to receive the oxygen concentration signal, and the ECM is in communication with the MAF sensor such that the ECM is configured to receive the MAF signal;
  a vehicle body assembly including:
    a body control module (BCM) in communication with the ECM;
    an instrument panel in communication with the BCM, wherein the instrument panel includes a display;
  wherein the ECM is specifically programmed to:
    calculate a fuel injection quantity of the internal combustion engine based on an oxygen concentration signal from an oxygen sensor and a MAF signal from a mass airflow (MAF) sensor only when none of a plurality of predetermined conditions exists, the plurality of predetermined condition includes: (a) the oxygen sensor is not active, (b) the oxygen sensor is faulty, and (c) a temperature of the oxygen sensor is less than a predetermined temperature threshold, wherein calculating the fuel injection quantity includes:
      determine a fuel injection quantity flow, wherein determining the fuel injection quantity flow includes:
        determine a fuel-to-air ratio based on the oxygen concentration signal received from the oxygen sensor;
        multiply the mass airflow of the intake air flowing through the intake line, as determined by the MAF sensor, times the fuel-to-air ratio, as determined based on the oxygen concentration signal received from the oxygen sensor, in order to determine the fuel injection quantity flow; and measure time, using an internal clock of the ECM, from a moment when the internal combustion engine starts running; and multiply the measured time times the fuel injection quantity flow in order to determine the fuel injection quantity;

determine an instantaneous fuel flow of the internal combustion engine based on the fuel injection quantity; and communicate the instantaneous fuel flow to the BCM;

wherein the BCM is specially programmed to:
determine an average fuel economy of the vehicle based on the instantaneous fuel flow, wherein the average fuel economy is a fuel efficiency of the vehicle described in terms of a relationship between a distance traveled by the vehicle and an amount of fuel consumed by the vehicle; and command the display on the instrument panel to display the average fuel economy.

11. The vehicle of claim 10, wherein the average fuel economy is a ratio of a distance traveled by the vehicle divided by a fuel consumed in volume by the internal combustion engine during a traveled distance.

12. The vehicle of claim 11, further comprising a torque request actuator and an actuator position sensor coupled to the torque request actuator, wherein the actuator position sensor is configured to generate a position signal is indicative of a position of the torque request actuator, the ECM is specifically programmed to determine an accumulated fuel consumption based on the oxygen concentration signal from the oxygen sensor, the MAF signal from the MAF sensor, and the position signal from the actuator position sensor.

13. The vehicle of claim 12, wherein the ECM is specifically programmed to determine an accumulated fuel consumption per engine cycle based on the oxygen concentration signal from the oxygen sensor, the MAF signal from the MAF sensor, and the position signal from the actuator position sensor.

14. The vehicle of claim 13, wherein the ECM is specifically programmed to determine the instantaneous fuel flow based on the fuel injection quantity, and the instantaneous fuel flow is a ratio of a fuel volume consumed by the vehicle divided by time.

15. The vehicle of claim 14, wherein the ECM is specifically programmed to communicate the accumulated fuel consumption to the BCM.

16. The vehicle of claim 15, wherein the ECM is specifically programmed to communicate the instantaneous fuel flow to the BCM.

17. The vehicle of claim 16, further comprising an odometer, wherein the BCM is specifically programmed to receive an odometer signal from the odometer of the vehicle, and the odometer signal is indicative of the distance traveled by the vehicle.

18. The vehicle of claim 17, wherein the average fuel economy is based on the distance traveled by the vehicle and the accumulated fuel consumption.

19. The vehicle of claim 18, wherein the ECM includes an engine processor, an engine memory in communication with the engine processor, and a clock in communication with the engine processor and the engine memory, the BCM includes a body processor and a body memory in communication with the body processor, the oxygen sensor is directly coupled to the exhaust line, the MAF sensor is directly coupled to the intake line, and the ECM is specifically programmed to determine the fuel injection quantity solely based on a feed forward correction map and the position of the torque request actuator only when any of the predetermined conditions exist.

20. A system, comprising:
an oxygen sensor configured to measure an oxygen concentration of exhaust gases flowing through an exhaust line of an engine assembly, wherein engine assembly includes an internal combustion engine in fluid communication with the exhaust line, and the oxygen sensor is configured to generate an oxygen concentration signal indicative of an oxygen concentration of exhaust gases;

a mass airflow (MAF) sensor configured to measure a mass airflow of an intake air flowing through an intake line of the engine assembly, wherein the internal combustion engine is in fluid communication with the intake line, and the MAF sensor is configured to generate a MAF signal indicative of the mass airflow of the intake air flowing through the intake line;

an engine control module (ECM) is in communication with the oxygen sensor such that the ECM is configured to receive the oxygen concentration signal, and the ECM is in communication with the MAF sensor such that the ECM is configured to receive the MAF signal;

a body control module (BCM) in communication with the ECM;

an instrument panel in communication with the BCM, wherein the instrument panel includes a display;

wherein the ECM is specifically programmed to:
calculate a fuel injection quantity of the internal combustion engine based on an oxygen concentration signal from an oxygen sensor and a MAF signal from a mass airflow (MAF) sensor only when none of a plurality of predetermined conditions exists, the plurality of predetermined condition includes: (a) the oxygen sensor is not active, (b) the oxygen sensor is faulty, and (c) a temperature of the oxygen sensor is less than a predetermined temperature threshold, wherein calculating the fuel injection quantity includes:
determine a fuel injection quantity flow, wherein determining the fuel injection quantity flow includes:
determine a fuel-to-air ratio based on the oxygen concentration signal received from the oxygen sensor;
multiply the mass airflow of the intake air flowing through the intake line, as determined by the MAF sensor, times the fuel-to-air ratio, as determined based on the oxygen concentration signal received from the oxygen sensor, in order to determine the fuel injection quantity flow;
measure time, using an internal clock of the ECM, from a moment when the internal combustion engine starts running; and
multiply the measured time times the fuel injection quantity flow in order to determine the fuel injection quantity;
determine an instantaneous fuel flow of the internal combustion engine based on the fuel injection quantity; and
communicate the instantaneous fuel flow to the BCM;
wherein the BCM is specially programmed to:

determine an average fuel economy of a vehicle including the engine assembly based on the instantaneous fuel flow, wherein the average fuel economy is a fuel efficiency of the vehicle described in terms of a relationship between a distance traveled by the vehicle and an amount of fuel consumed by the vehicle; and command the display on the instrument panel to display the average fuel economy.

* * * * *